July 13, 1954 — M. M. BORDEN — 2,683,372
FLUID LEVEL INDICATING GAUGE
Filed May 18, 1951 — 2 Sheets-Sheet 1
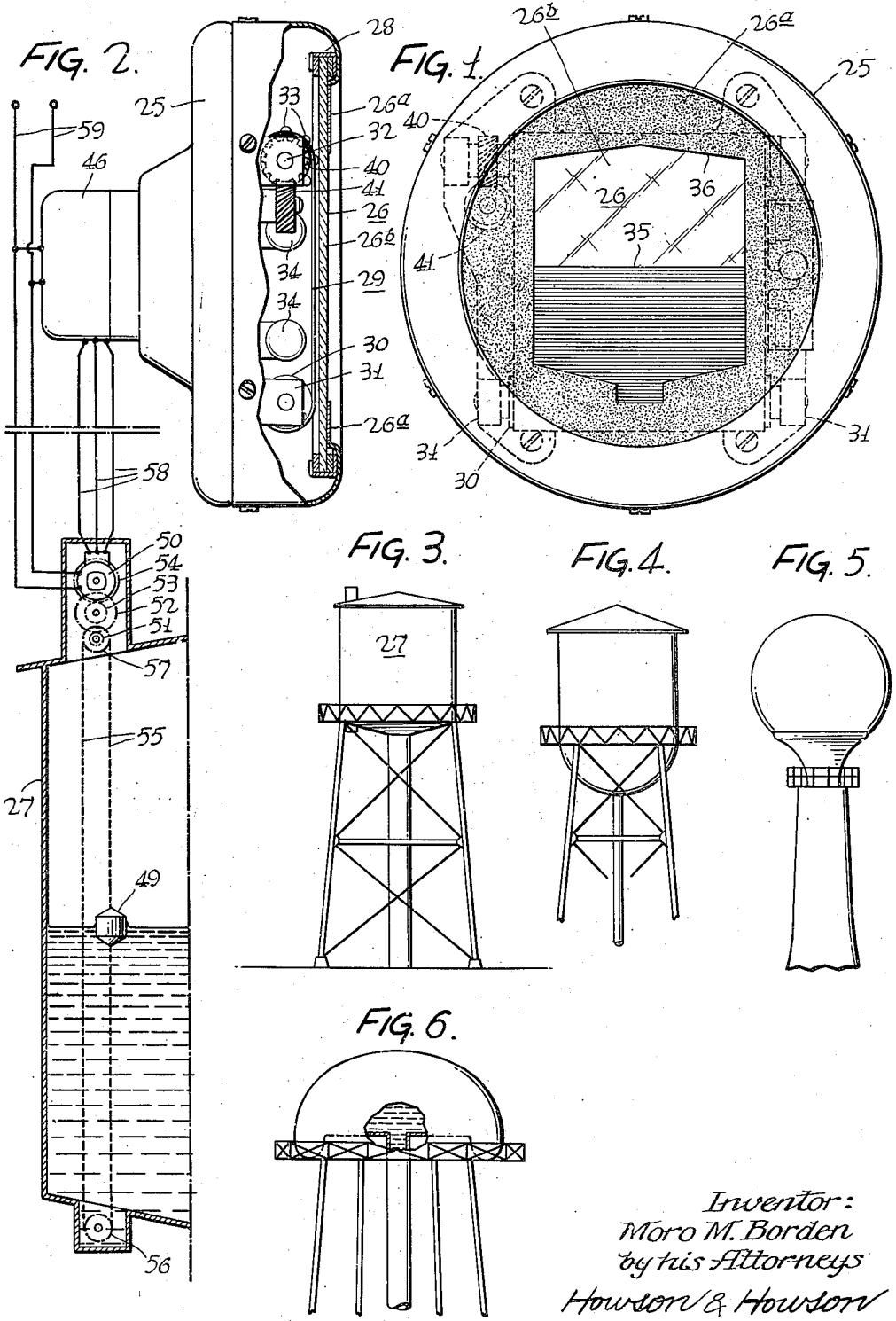
Inventor:
Moro M. Borden
by his Attorneys
Howson & Howson

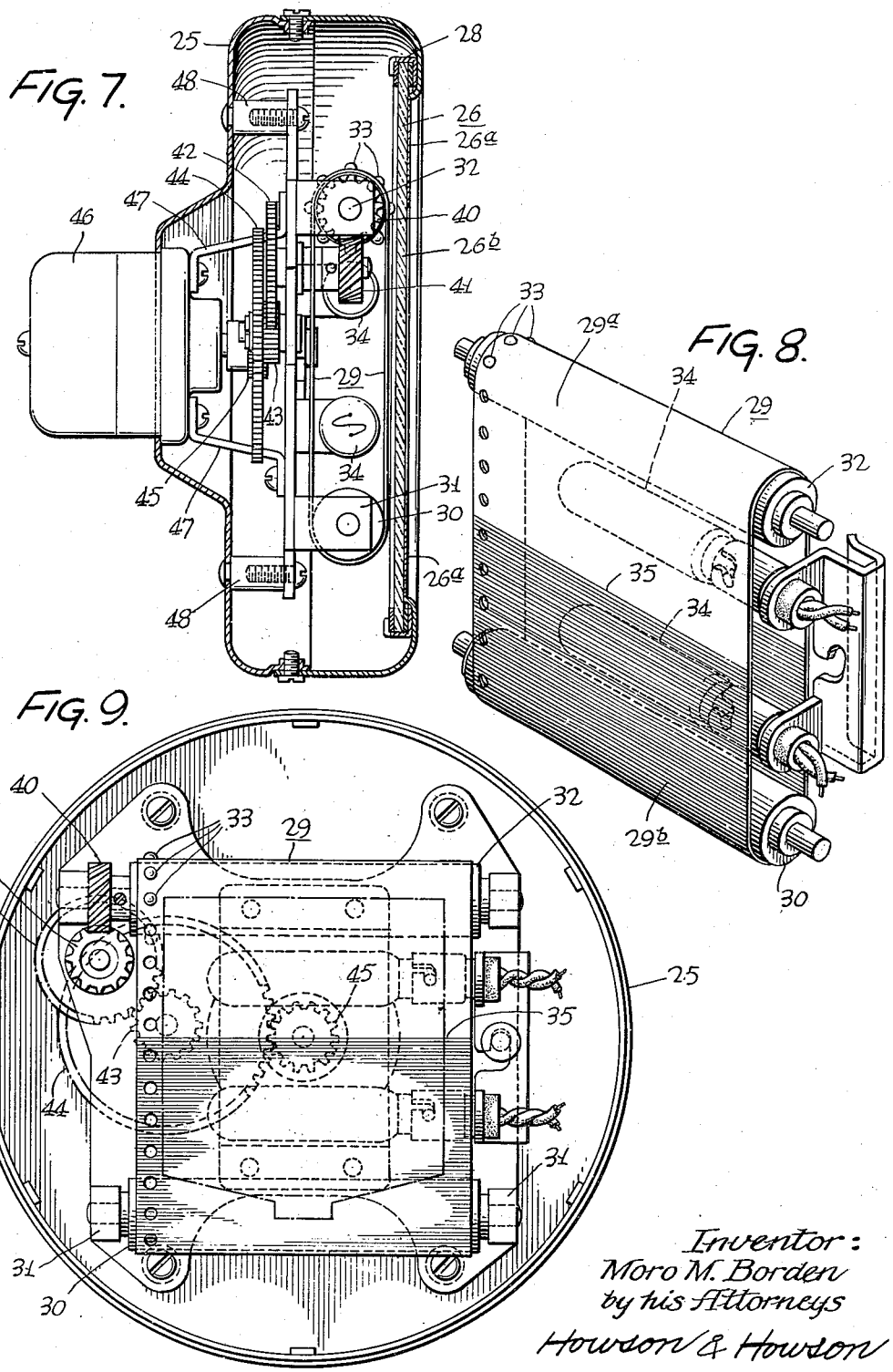

Patented July 13, 1954

2,683,372

UNITED STATES PATENT OFFICE 2,683,372

FLUID LEVEL INDICATING GAUGE

Moro M. Borden, Collingswood, N. J., assignor to Simplex Valve & Meter Co., Philadelphia, Pa., a corporation of Delaware Application May 18, 1951, Serial No. 227,004

4 Claims. (Cl. 73—321)

This invention relates to gauges of the indicating type and has to do more particularly with a gauge constructed to indicate the height of the contents of a fluid container at a remote location.

In many circumstances, it is required to provide an indicating device which shows the quantity of liquid in a reservoir or tank, located at some remote distance from the indicating device. Heretofore, gauges for this purpose utilized calibrated scales having a needle or pointer of some sort movable over the scale, so that the contents of the container may thus be calculated. All previously known gauges of this type utilize a scale or an arbitrary reference point having no relationship to the actual shape of the reservoir. Quick reading of such a gauge is frequently erroneous due to the size or arrangement of the graduations and indicia. Furthermore, if the only information required is the relation the liquid in the reservoir bears to the total capacity of the reservoir, time is frequently lost in converting a scale reading to usable information. For example, even though the gauge reads accurately in gallons, unless the total volume of the reservoir is known, the attendant cannot tell whether the reservoir is full or nearly empty.

The present invention contemplates an indicating system which utilizes an improved gauge provided with an outline, on the face of the gauge, of the container to which the gauge is connected. This outline is desirably of the same shape and proportions as the container. In the preferred form of my present invention, a vertically movable screen associated with the outline has a relatively oqaque lower area and a relatively translucent upper area. Furthermore, the movement of the screen is so controlled by the fluctuation of liquid level in the container that the border between the opaque and translucent areas corresponds to the height of the liquid in the reservoir. In this way, the opaque area of the screen which is visible through the reservoir outline on the gauge face serves as an index, and its position with respect to the outline of the reservoir corresponds to the volume of liquid in the reservoir.

It will thus be apparent that an attendant need only to glance at the gauge to determine instantly whether the reservoir is full, half full, or nearly empty. In the vast majority of installations, this is all the information required by the attendant to enable him to start or stop pumps or to manipulate suitable valves. Since the screen moves vertically from top to bottom and represents the actual volume of liquid in the reservoir, it serves as one form of horizontally-extending index and no other reference point, calibrations or scale are required on the gauge.

A primary object of the invention therefore, is to provide a gauge of the indicating type having an outline on the face thereof, of the container or reservoir whose contents are to be measured, and a vertically movable screen in back of the face serving as an index of such contents and which is responsive to the level of the fluid in said container or reservoir.

A further object of the invention is to provide in an indicating gauge of the type described herein a gauge that is readily adaptable to indicating the contents of a wide variety of containers.

A further object of the invention is to provide in an indicating system for containers at remote locations, a gauge having the outline of the reservoir to be measured on the face thereof.

Other objects will be apparent from the specification and drawings in which:

Fig. 1 is a face view of a gauge constructed in accordance with the present invention;

Fig. 2 shows the gauge of Fig. 1 operatively connected to a liquid reservoir;

Fig. 3 shows a reservoir of the type illustrated in Fig. 2;

Figs. 4–6 show various other types of tanks or reservoirs that can be utilized with the present invention;

Fig. 7 is an enlarged vertical section of the gauge of Fig. 1;

Fig. 8 is a perspective showing a part of the structure of Fig. 7; and

Fig. 9 is a front view of the gauge with the cover and face removed.

The present invention utilizes a gauge body 25 which supports a lens or gauge glass 26 having an opaque area 26a and a relatively transparent or translucent area 26b having the same outline and proportions as the reservoir 27, the level of the liquid within which is to be indicated by the gauge. The gauge glass 26 is generally supported in the gauge housing 25 by means of suitable clamps 28, 28 so that it is rigidly supported in front of a movable screen 29. Screen 29 is mounted on a lower roller 30 journalled in posts 31, 31 and the screen contains suitable perforations along at least one edge so that the upper roller 32 controls the movement of the screen by means of pins 33, 33 which cooperate with the perforations therein.

If desired, one or more sources of illumination such as electric lamps 34, 34 may be mounted directly in back of the forward ply of screen 29 (as shown in Fig. 8). In the form of the invention shown herein, the upper portion 29a of the screen is relatively clear or of a lighter color than the lower portion 29b which may desirably have a blue tint. As shown in Fig. 7, the forward ply of the screen is located directly in back of the gauge glass 26 so that with or without the illumination provided by lamps 34, 34, the position of the dividing line 35 between the light area 29a on the screen and the darker area 29b serves as an index and can be observed at a glance. The control system for upper roller 32 is such that when the reservoir 27 is full, the dividing line 35 is near the top 36 of the reservoir outline. Conversely, when the reservoir 27 is empty, the dividing line 35 descends due to movement of rollers 30 and 32 so that it will be near the bottom of the reservoir outline on glass 26.

The mechanism for actuating the screen in accordance with the volume of fluid in tank 27 in itself forms no part of the present invention and it will be understood that although one operative system is described and illustrated herein, any accurate control mechanism may be substituted therefor within the scope of the invention, provided the outline of the container on the gauge corresponds to the shape of the container being measured and the position of dividing line 35 on the screen 29 is so controlled that it corresponds to the position of the liquid level in the reservoir.

In the preferred form of indicating system, the upper roller 32 which carries the screen 29 is driven through a reduction gear train comprising worm gears 40, 41 and cogs 42, 43; 44, 45, the last one of which is keyed to the shaft of a Selsyn receiver 46. The receiver 46 as well as the gear train are suitably supported in the gauge case 25 by means of brackets 47, 47 and 48, 48.

Referring now to Fig. 2, the tank or reservoir 27 is provided with a float 49 which controls a Selsyn transmitter 50 through a gear train 51, 52 and 53, 54. Float 49 may be secured to an endless chain 55 passing over lower sprocket 56 and upper sprocket 57. The Selsyn transmitter 50 is connected to the Selsyn receiver 46 through electrical leads 58, 58 and both receiver 46 and the transmitter 50 are connected to a suitable source of power through leads 59, 59. It will be understood that the operation and electrical connections for the Selsyn system are well known in the art and therefore further detailed explanation is believed to be unnecessary. The system utilized to move the screen 29 may be electrical, mechanical or it may employ devices other than a Selsyn transmitter, the only requirement being that the movement of the screen is proportional to fluctuations of liquid in the reservoir.

Using a control system the same as or similar to that described above, it is entirely feasible to install my improved indicating gauge on tanks or reservoirs that have widely different shapes and volumes and yet complicated calibrations are unnecessary in order to obtain accurate gauge readings. What is more important, the shape of the reservoir in no way affects the accuracy of the gauge in any area because the gauge simply depicts the level of the fluid in the reservoir without any attempt to convert this level into gallons or cubic feet. For example, the reservoirs such as shown in Figs. 5 and 6 having asymmetrical shapes would require extremely delicate calibrations in a gauge to give an accurate reading in gallons, particularly as the contents of the tank approaches a substantially full or substantially empty condition.

In the gauge described in the present invention, it is only necessary to transfer the outline of the reservoir to the face or glass 26 simply by painting out the background or by inserting a suitable mask over the glass. It is then only necessary to set the control mechanism so that the dividing line or index 35 is near the top of the reservoir outline when the tank is full and said line or index 35 is correspondingly at the bottom of the outline when the reservoir is empty. It will be noted that such procedure works equally well with any shape of reservoir whether it be square, rectangular, or cylindrical, or of an irregular shape such as those shown in Figs. 4–6.

Having thus described my invention, I claim:

1. A fluid level indicator for reservoirs and the like, comprising an indicator casing, a face on said casing having an outline of the reservoir thereon, a movable member in said casing providing a straight indicating line in association with said outline representative of the fluid level in said reservoir, means in said casing to actuate said member, and means operable according to the fluid level in said reservoir for operating said actuating means to effect positioning of said line relative to said outline in correspondence to the fluid level in said reservoir.

2. A fluid level indicator for reservoirs and the like, comprising an indicator casing, a face on said casing having an outline of the reservoir thereon, a movable screen within said casing adjacent to said face, said screen having a straight indicating line thereon arranged in relation to said outline so that said line represents the fluid level in the reservoir, and means operable according to the fluid level in the reservoir for moving said screen relative to said outline to effect positioning of said line in correspondence to the fluid level in said reservoir.

3. A fluid level indicator for reservoirs and the like, comprising an indicator casing, a face on said casing having an outline of the reservoir thereon, a movable screen within said casing adjacent to said face, said screen having two individually distinguishable portions with a straight line of division therebetween arranged in relation to said outline so that one of said portions represents the fluid in said reservoir and the line of division between said portions represents the fluid level in the reservoir, and means operable according to the fluid level in the reservoir for moving said screen relative to said outline to effect positioning of said line in correspondence to the fluid level in said reservoir.

4. A fluid level indicator for reservoirs and the like, comprising an indicator casing, a face on said casing having an outline of the reservoir thereon, a movable screen within said casing adjacent to said face, said screen having two portions of different light transmissivity with a straight line of division therebetween arranged in relation to said outline so that one of said portions represents the fluid in said reservoir and the line of division between said portions represents the fluid level in the reservoir, a light source within said casing arranged in association with said screen portions to make them clearly distinguishable from one another, and means operable according to the fluid level in the reservoir for moving said screen relative to said outline to effect positioning of said line in correspondence to the fluid level in said reservoir.

References Cited in the file of this patent

UNITED STATES PATENTS

| Number | Name | Date |
|--------|------|------|
| 404,384 | Cunnyngham | June 4, 1889 |
| 1,667,769 | Callan | May 1, 1928 |
| 1,977,434 | Eynon | Oct. 16, 1934 |